United States Patent [19]

Lefkowitz et al.

[11] 4,181,514

[45] Jan. 1, 1980

[54] STITCH KNITTED FILTERS FOR HIGH TEMPERATURE FLUIDS AND METHOD OF MAKING THEM

[75] Inventors: Leonard R. Lefkowitz, Latham; W. Henrik Krohn, Chatham, both of N.Y.

[73] Assignee: Huyck Corporation, Wake Forest, N.C.

[21] Appl. No.: 877,706

[22] Filed: Feb. 14, 1978

[51] Int. Cl.$^2$ .............................................. B01D 39/08
[52] U.S. Cl. ......................................... 55/488; 55/521; 55/523; 55/524; 55/525; 55/528; 55/DIG. 5; 210/504; 210/505; 210/509; 66/193
[58] Field of Search ............. 55/486, 487, 488, 491, 55/521, 524, 527, 528, DIG. 5, DIG. 16, 523, 526, 25; 66/125 A, 169 R, 169 A, 170, 192, 193; 428/102, 104; 156/148; 210/504, 505, 507–509

[56] References Cited

U.S. PATENT DOCUMENTS

| | | | |
|---|---|---|---|
| 2,152,415 | 3/1939 | Krasselt ............................ | 66/125 A |
| 2,664,409 | 12/1953 | Aickin et al. ..................... | 66/125 A |
| 2,933,154 | 4/1960 | Lauterbach ........................ | 55/486 |
| 2,962,082 | 11/1960 | Lenney ............................. | 156/148 |
| 3,201,926 | 8/1965 | Harrington ........................ | 55/486 |
| 3,262,578 | 7/1966 | Dennis .............................. | 55/487 |
| 3,506,133 | 4/1970 | Lee .................................. | 210/505 |
| 3,675,403 | 7/1972 | Ruffo ............................... | 55/524 |
| 3,704,191 | 11/1972 | Bursch et al. ..................... | 156/148 |
| 3,719,546 | 3/1973 | Parlin .............................. | 156/148 |
| 3,948,722 | 4/1976 | Gill et al. ........................ | 66/192 |
| 3,972,694 | 8/1976 | Head ................................ | 210/505 |
| 4,056,476 | 11/1977 | Mouwen et al. .................... | 210/507 |
| 4,070,519 | 1/1978 | Krohn et al. ...................... | 55/528 |
| 4,072,793 | 2/1978 | Watanabe et al. .................. | 210/507 |

FOREIGN PATENT DOCUMENTS

| | | | |
|---|---|---|---|
| 889978 | 1/1972 | Canada ............................. | 55/524 |
| 2124265 | 11/1972 | Fed. Rep. of Germany ........ | 210/508 |
| 2422490 | 11/1974 | Fed. Rep. of Germany ........ | 210/507 |
| 2521334 | 11/1976 | Fed. Rep. of Germany ........ | 55/527 |
| 2097234 | 3/1972 | France ............................. | 55/521 |

*Primary Examiner*—David L. Lacey
*Attorney, Agent, or Firm*—Frost & Jacobs

[57] ABSTRACT

A dimensionally stable filter structure for high temperature applications and method of making it. The filter structure comprises at least one batt of relatively brittle fibers, known to possess outstanding degradation resistance at elevated temperatures, stitch-knitted with high temperature and corrosion resistant yarns.

30 Claims, 6 Drawing Figures

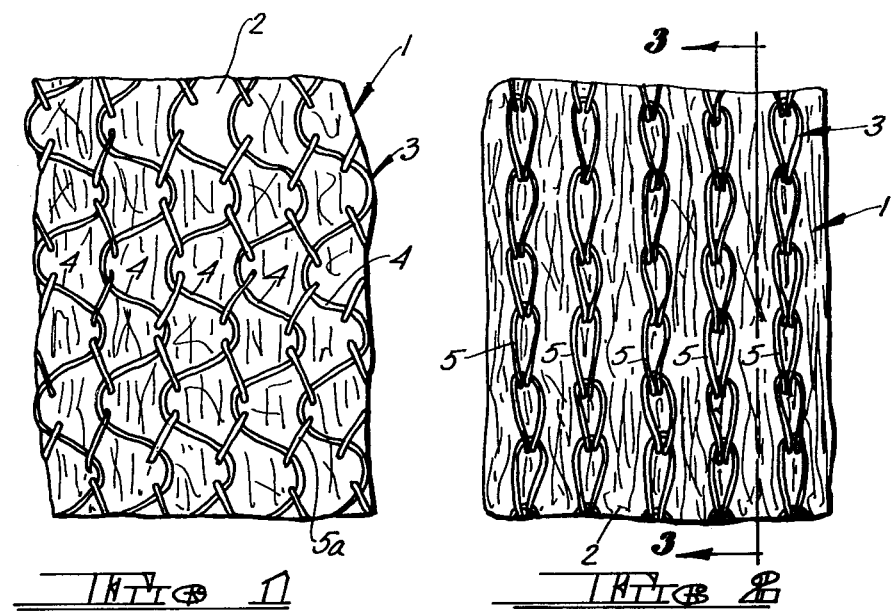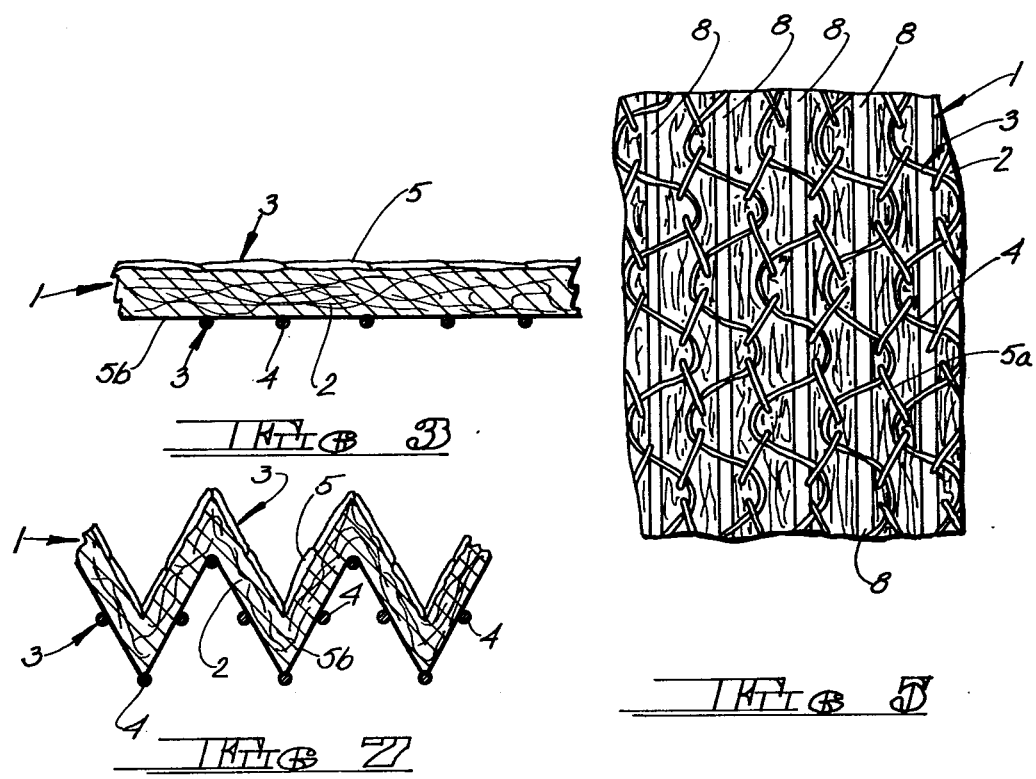

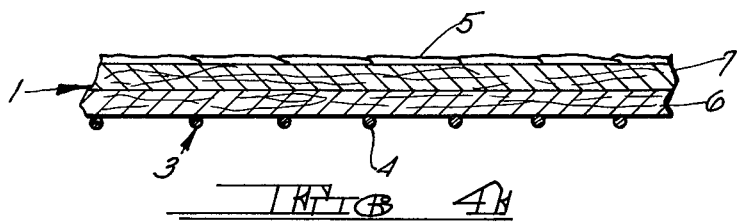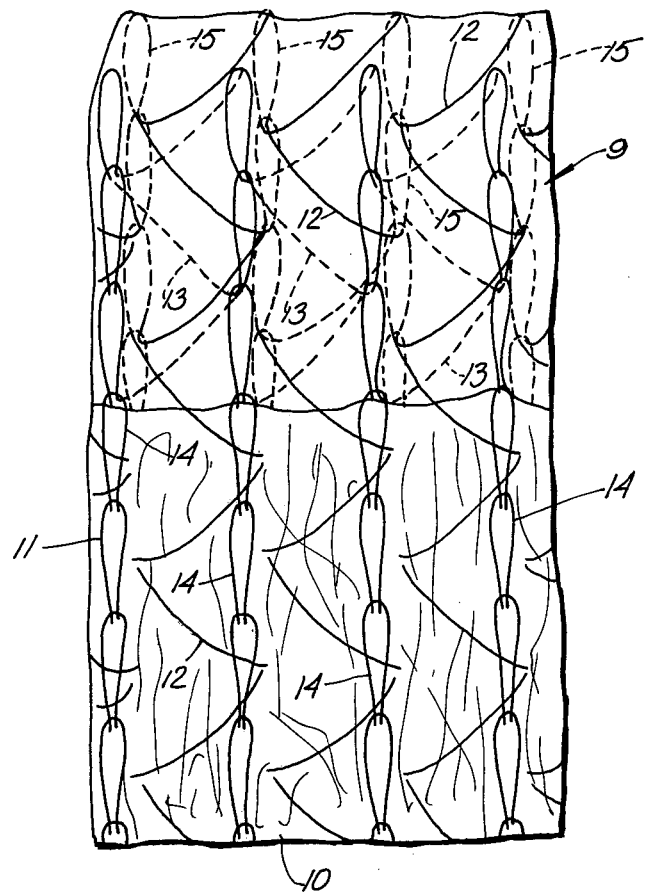

STITCH KNITTED FILTERS FOR HIGH TEMPERATURE FLUIDS AND METHOD OF MAKING THEM

BACKGROUND OF THE INVENTION

1. Field of the Invention

The invention relates to a dimensionally stable filter structure for high temperature applications, and more particularly to a fibrous filter batt reinforced by monofilament or multifilament yarns and formed into a unified structure by the stitch-knitting technique.

2. Description of the Prior Art

The filter structures of the present invention may have many and varied applications. While not necessarily so limited, they are particularly useful in high temperature applications. The filters may be used to remove foreign and particulate material from fluids in either gaseous or liquid form. For purposes of an exemplary showing they will be described in terms of their use in the removal of dust and foreign material from gases.

In recent years there has been increased interest in the control of air pollution. Stringent restrictions have been imposed relating to the nature and condition of gases which are discharged into the ambient atmosphere. Problems are encountered wherever fuels are burned. Power generating plants and various types of factories are examples of instances where hot dust and particle laden gases are generated and must be treated by filtering or other means prior to discharge to the atmosphere. An exemplary and nonlimiting application of the filters of the present invention is to be found in filter bag houses in common use by industry.

Prior art workers have devised numerous types of filter media involving the use of knitted metallic strands. For example, U.S. Pat. No. 2,274,684 teaches a filter medium comprising a single ply warp knit metallic fabric made up of comparatively stiff wire. The single ply warp knit fabric is built up into a filter body by superimposing sheets thereof upon themselves or by rolling a strip thereof. U.S. Pat. No. 2,929,464 teaches a flat knit filter media. Three filter elements are knitted of metallic flattened strips or ribbons into a cylindrical or stocking form. Each element is thereafter flattened and these elements are superimposed upon a foraminous sheet metal support. The structure is completed by a final layer of corrugated or ribbed woven wire screen. U.S. Pat. No. 2,792,075 teaches a filter pad formed of layers of knitted metal wire of small gauge placed one upon another and rolled or wound into a tight coil. U.S. Pat. No. 2,334,263 describes a filter or strainer body produced from metallic fabric of comparatively heavy gauge wire and having relatively large mesh openings. The knitted metallic mesh is either flat or tubular knit and is thereafter run through corrugating rolls so as to form successive crimps or corrugations extending obliquely across the mesh strip. The strip is folded lengthwise upon itself to form a plurality of superposed plies with the crimps or corrugations crossing one another in non-nesting relationship. The folded mesh strip is then tightly rolled into a cylindrical body and subjected to compression in the direction of its length.

Prior art workers have also combined knitted metallic strands and fibrous material to form various types of filter elements. U.S. Pat. No. 2,322,513 teaches a tubular knit wire mesh sleeve surrounding a filter body mass which may be made up of fibrous or filamentary material. Of particular interest is U.S. Pat. No. 2,758,671 directed to a high temperature filtering medium. In accordance with the teachings of this patent, a core layer of inorganic fibers resistant to high temperatures is disposed between layers of fabric made from material resistant to high temperatures. Depending upon the temperatures to be encountered, the exterior fabric layers may be made of acrylic fibers, ceramic fibers, the same inorganic fibers as the core layer, or the like. The reference also speaks of fabrics made from various metals. The core and exterior layers are fastened together by quilting to form patches. Other fastening means inclusive of staples, clips and the like may also be used to form the patches.

The filters of the present invention are characterized by a novel construction in which at least one batt of relatively brittle, high temperature resistant fibers reinforced by high temperature and corrosion resistant metallic monofilament or metallic or glass multifilament yarns through the stitch-knitting technique. This technique results in a filter structure wherein the batt is encapsulated between two outer stitch-knitted yarn layers which are integrally connected through the batt. Since the two outside knit reinforcement layers are formed through the batt itself, a unified and dimensionally stable structure results. As used herein and in the claims, the term "high temperature" is intended to refer to fluids at a temperature of about 600° F. or more. The filters of the present invention are capable of withstanding prolonged exposure to such temperatures for periods of several months or more (depending on the nature of the application) with a minimum loss of physical properties. The process by which the filters of the present invention are made involve the use of readily available, commercial stitch-knitting machines. Exemplary stitch-knitting machines are manufactured by Kdynske Strojirny National Company, Praha, Czechoslovakia under the trademark ARACHNE and by Veb Nahwirkmaschinenbau, Berlin, East Germany under the trademark MALIMO.

The filters of the present invention are characterized by dimensional stability resulting from the use of the stitch knitted yarns. By this is meant that the novel filter structure possesses inherent resistance to distortion under operating conditions. The filter structure will flex, but it will not deform to the extent that it would be rendered useless during its use. On the other hand, when using metallic monofilament yarns, for example, the filter structure can be mechanically pre-formed into structures such as pleated structures which are capable of retaining their shape indefinitely.

SUMMARY OF THE INVENTION

The high temperature filter structure of the present invention comprises at least one batt of relatively brittle fibers, known to possess outstanding degredation resistance at elevated temperatures, stitchknitted with high temperature and corrosion resistant metallic monofilament or multifilament yarns or glass multifilament yarns. The batt may be made up of webs folded upon themselves to achieve the required thickness for stitch-knitting. On the other hand, the batt may be air-laid to produce the desired thickness directly. Where required, steps are taken to strengthen or support the batt to enable it to be metered into the stitch-knitting machine. It is within the scope of the invention to incorporate more than one batt in the filter structure.

The stitch-knitting yarns comprise metallic monofilament or multifilament yarns or glass multifilament yarns. Such yarns may be used alone or in combination with other non-metallic yarn materials. The yarns may be provided with beneficial coatings, as will be described hereinafter. When relatively stiff monofilament metallic yarns are used, dimensional stability will generally be achieved without the need of added resins or thread systems. When flexible metallic multifilament yarns or glass multifilament yarns are used, in some cases it is desirable to reinforce the filter structure to assure dimensional stability. Such reinforcement may comprise laid-in straight chain stitch direction (warp) yarns, a woven open mesh fabric or scrim or resin treatment as will be described hereinafter.

The filter material is fabricated in the stitch-knitting machine using an appropriate stitch. Where desired, steps may be taken after the stitch-knitting step to close the small apertures in the batt formed by the stitch-knitting yarn passing therethrough. The filter material may thereafter be subjected to a heat or solvent treatment to remove any volatile matter, if present. It is within the scope of the invention to pleat or otherwise shape the filter material to meet specific end use needs. In certain cases, it may be further treated with a lubricant or resin.

BRIEF DESCRIPTION OF THE DRAWINGS

FIG. 1 is a fragmentary elevational view of a filter structure of the present invention, illustrating the weft stitch side of the filter.

FIG. 2 is a fragmentary elevational view similar to FIG. 1 and illustrating the other side or chain stitch side of the filter structure of FIG. 1.

FIG. 3 is a fragmentary cross sectional view taken along section line 3—3 of FIG. 2.

FIG. 4 is a fragmentary cross sectional view, similar to FIG. 3, and illustrating a filter structure having a core made up of two fibrous batts.

FIG. 5 is a fragmentary elevational view, similar to FIG. 1 and illustrating the inclusion of laid-in yarns in the warp or machine direction to increase the stability of the filter structure under conditions where it is subjected to machine direction tension loads.

FIG. 6 is a semi-diagrammatic, fragmentary, elevational view illustrating a filter structure of the present invention having both cross over loops and chain stitching on both sides of the filter batt.

FIG. 7 is a fragmentary cross sectional view, similar to FIG. 3 but illustrating the filter structure in pleated form.

DESCRIPTION OF THE PREFERRED EMBODIMENTS

FIGS. 1 through 3, wherein like parts have been given like index numerals, illustrate the filter structure of the present invention in its simplest form. The filter structure, generally indicated at 1, comprises a fibrous batt 2 stitch knitted with metallic monofilament yarns. For purposes of this exemplary showing, a simple two bar weft and chain stitch (generally indicated at 3) is illustrated. The weft stitch side of the filter structure is shown in FIG. 1 with the weft stitch yarns 4 formed into cross-over loops while the chain stitch side is shown in FIG. 2 with the chain stitch yarns indicated at 5. It will be understood by one skilled in the stitch-knitting technique that the cross-over loops shown on the weft stitch side (FIG. 1) are integrally joined with the chain stitch loops shown on the chain stitch side (FIG. 2) through the batt 2, since the chain stitch yarns 5, as at 5a, pass alternately from side-to-side through the batt and around the weft stitch yarns 4. In this way, the relatively brittle fibers of the non-woven batt 2 and the metallic yarns achieve a unified structure having structural integrity and strength through the stitch-knitting technique.

As indicated above, for purposes of an exemplary showing a simple two bar weft and chain stitch is illustrated in FIGS. 1 through 3. Commercially available stitch-knitting machines are capable of producing numerous common stitch variations including chain, tricot, plain, weft and chain, chain and tricot, tricot with lay-in, and the like. Any of the well known stitch variations may be employed in the practice of the present invention, the stitch variation used being selected with an eye toward the ultimate product desired and its application.

The batt 2 is a non-woven structure made up of organic or inorganic, relatively brittle fibers known to possess outstanding degredation resistance at elevated temperatures. Glass fibers, silica fibers, ceramic fibers, carbon fibers, graphite fibers, or the like may be employed.

While the fibers may be formed into a web and cross-lapped to build up the required thickness for stitch-knitting, an air-laid batt is often prefered since the desired thickness can be achieved directly without the need for cross-lapping.

In the air-laying process, the fibers are first opened or individualized. If more than one type of fiber is to be used in the batt, the fibers are blended.

Prior to the formation of the batt, the batt fibers may be be additionally pretreated, if desired. For example, in the use of glass fibers, it has been found advantageous to treat the fibers, prior to opening, with from about 0.5% to about 3% of an anti-static lubricant, such as those sold by Emery Industries, Cincinnati, Ohio, under the marks Emerstat 7450 and Emerstat 7451, to facilitate processing with minimum fiber breakage.

The stitch-knitting technique obviates the need for a coating or binder to maintain the integrity and consolidation of the batt in the final product form and during use of the filter structure. The stitch-knitting yarn itself will provide satisfactory encapsulation and protection of the brittle fibrous filter mat material. Nevertheless, a coating or lubricant such as silicone oil or resin and inorganic salts may be applied to the fibers, prior to or after stitch-knitting, to reduce abrasion of the fibers through rubbing of the fibers together or against the stitch-knitted mesh during the processing and during use of the final filter structure. An exemplary lubricant is sold by General Electric Company, Waterford, N.Y., under the designation SF 1154.

Prior to stitch-knitting, it is generally necessary to support the batt or increase the batt integrity so that it can be metered into the stitch-knitting machine without damage or separation. This can be accomplished in several ways. First the batt may be lightly needled to a non-woven substrate of spun bonded polyester or nylon fibers. Excellent results have been achieved for example, by use of polyester spun-bonded material manufactured by E. I DuPont De Nemours, Inc. of Wilmington, Delaware, under the trademark REEMAY. After stitch-knitting, the nonwoven substrate may be burned away. The batt may be strengthed by resin bonding of the fibers (i.e. joining the fibers together by the use of adhesive chemicals), or by hot calendering with thermoplastic fibers interspersed in the batt blend so as to accomplish fusion bonding. With some types of batts needling alone will provide sufficient strength.

It may be found advantageous in some cases to support the batt on a light weight, open mesh, woven fabric or scrim. Such open mesh fabric or scrim could be located on both sides of the batt if desired. The open mesh, woven fabric or scrim is preferably composed of high temperature corrosion resistant fiber materials (such as glass fibers, metallic fibers or the like) so that it will add to the dimensional stability of the stitchknitted end product as well as performing a supporting function during the batt feed step. A scrim is illustrated at 5b in FIG. 3.

Once the batt has been formed and appropriately treated or supported to enable it to be metered into the stitchknitting machine, the batt is stitch-knitted with high temperature, corrosion-resistant yarns. Excellent results have been achieved with yarns such as stainless steel monofilament yarns, although monofilament yarns made of Monel, Inconel or other alloys may also be employed. When metallic yarns of the relatively stiff monofilament type are used a pleatable dimensionally stable structure is achieved without the need for resin treatment or other permanent reinforcement means. If desired, the yarns may be provided with beneficial coatings such as a low friction coating of fluorinated hydrocarbons, silicones, or the like. The monofilament metallic yarns will preferably be from about 3 to about 12 mils in diameter.

When flexible multifilament metallic yarns are used, in some cases it will be necessary to stabilize the structure subsequent to stitch-knitting by using a dimensionally stable open mesh woven fabric or scrim fed into the stitch-knitting machine along with the batt or by adding stable laid-in yarns to the batt, as described above.

When glass multifilament yarns are used, it is desirable to stabilize the structure by any of the methods described with respect to the use of flexible multifilament metallic yarns. The term "glass yarns" as used herein and in the claims is intended to refer to yarns made of glass, ceramic, guartz and the like. The glass stitch-knitting yarns should be pretreated with a material such as silicon oils, aromatic and aliphatic polyglycolethers, or the like for increased lubricity, flexibility and abrasion resistance.

It will be evident that when metallic or glass multifilament stitch-knitting yarns are used, in many instances the means used to add dimensional stability to the end product may also serve as batt support or reinforcing means during the batt feed step.

The stitch-knitting filter structure, following the stitch-knitting step, may be further treated to place it in better condition for its final end-use. For example, when the filter batt material contains volatile matter, the material may be subjected to a heat treatment or a solvent treatment to remove such volatile matter. Where desired, additional steps may be taken to achieve controlled thickness and the closing of pore spaces at those points where the knitting yarns pass through the batt, as will be described hereinafter. Finally, the filter material will be fabricated into its final filter end-use form. The final end-use form of the filter material will depend, of course, on its ultimate application. As an example, when the filter material is to be used in a bag house, it will be formed into a long, substantially cylindrical bag for this purpose, as is well known in the art. When the filter material is to be used in a cartridge filter, it may be permanently pleated prior to use as shown in FIG. 7.

It is within the scope of the present invention to provide a filter material wherein two or more batts are superposed and stitch-knitted. An exemplary embodiment of this is illustrated in FIG. 4. FIG. 4 is similar to FIG. 3 and like parts have been given like index numerals. The embodiment of FIG. 4 differs from that of FIG. 3 in that the structure comprises a pair of superposed batts 6 and 7. For example, the batt 6 may constitute a fine glass fiber batt, composed of 3 to 4 micrometer diameter fibers, used as the surface facing the particle laden gas stream and acting as a filter element. The batt 7 may comprise a coarse stainless steel fiber batt, composed of 12 micrometer diameter fibers, facing the clean air or exiting air side of the structure, and acting as strong supporting, non-clogging, abrasion-resistant substrate. The fibers of batt 6 may range up to about 10 microns in diameter while the fibers of batt 7 may range up to about 50 microns in diameter. The number of batts used and their nature will depend upon the ultimate end-use of the filter structure and selection of appropriate batts for their particular characteristics is well within the skill of the worker in the art.

FIG. 5 illustrates another embodiment of the present invention. The filter structure of filter 5 is similar to that of FIG. 1 and like parts have been given like index numerals. The embodiment of FIG. 5 differs from that of FIG. 1 in that the filter structure includes straight, laid-in yarns 8 in the chain stitch direction. The laid-in yarns 8 may be metallic or non-metallic, monofilament or miltifilament, but should be high temperature and corrosion resistant. The laid-in yarns serve to provide additional stability in the chain stitch direction, knitted loops having some degree of stretchiness. The laid-in yarns will increase the stability of the fabric under conditions where it is subjected to relatively high tension loads in the chain stitch direction. Such loads are encountered, for example, in shaker or reverse-air bag houses where the filter bags (having a tube length up to 40 feet) are placed under tension. Laid in yarns may also be used to enhance the permanance of pleats when this feature is desired.

Yet another variant of the filter material of the present invention is illustrated in FIG. 6. In this instance, the filter material (generally indicated at 9) is made up of a fibrous batt 10 and an appropriate stitch-knitting yarn 11. Where additional strength characteristics are required of the filter material, the material may be double stitch-knitted as illustrated semi-diagrammatically in FIG. 6. Such a double stitch-knitting is well known in the art. For purposes of an exemplary showing a combination of two tricot stitches is illustrated. This stitch-knitting method results in the appearance of cross-over loops on both sides of batt 10. One set of cross over loops is illustrated in full lines at 12, while the cross over loops on the opposite side of batt 10 are shown in broken lines at 13. Similarly, both sides of the batt display a chain stitch, one set of which is shown in solid lines at 14, while the chain stitch on the other side of the batt is illustrated in broken lines at 15.

As indicated above, in some instances it may be desirable to close the small apertures in the stitch-knitted fabric caused by the yarns passing through the batt. This may be accomplished in several ways. For example, once the stitch-knitted structure has been formed, it may be mechanically pressed by calendering. This step will not only tend to close the small apertures in the batt, but will also permit control of the pore spaces between batt fibers as well as the desired thickness of the final product. It would also be possible to precoat the stitch knitted fabric with small diameter particles of a sinterable nature which would preferentially fill the small apertures at the stitch-through points. The particles lodging within the apertures would be sintered or otherwise permanently locked in place to prevent leakage through the filter during use. For example, such particles may be composed of polytetraflouroethylene, low melting point fine glass beads, or other fuseable or sinterable materials.

EXAMPLE I

A filter material was produced on an Arachne stitch-knitting machine having a working width of 2500 mm (approximately 100 inches). The batt comprised two 8 ounce per square yard layers of Beta diameter (3.8 micron) fiberglass needled to a 2.5 ounce per square yard Reemay polyester spun-bonded substrate.

An annealed type 304 stainless steel monofilament yarn of 5 mil diameter was used in the stitch-knitting machine employing a two bar tricot stitch having 12 courses per inch (i.e. 12 stitches per inch in the chain stitch direction) with a machine gauge of 40 needles per 10 centimeters or 10 chain stitches per inch. The end product had a fabric weight of 27.4 ounces per square yard and an air permeability of 29 cubic feet per minute per square foot at 0.5 inch water column.

The finished filter material end product demonstrated a high efficiency of 99.9% at a low pressure drop of 2.4 inches of water, operating at 10 feet per minute air flow rate in a simulated pulse jet laboratory test. Fine grade Arizona dust at 4 grains per cubic foot inlet concentration was used.

EXAMPLE II

A filter material was produced as described with respect to Example I above with the exception that a weft and chain stitch was employed. The end product filter material had a fabric weight of 21.4 ounces per square yard and an air permeability of 23 cubic feet per minute per square foot at 0.5 inch water column.

When tested at an air flow rate of 15 feet per minute under the same conditions described with respect to Example I, the end product filter material demonstrated a high cleaning efficiency of 99.9% at a pressure drop of 5.8 inches of water.

EXAMPLE III

A filter material was produced as described with respect to Example I above with the exceptions that a weft and chain stitch was employed and the batt was a two layer structure. The first layer (intended to face the particle laden gas stream) comprised an eight ounce per square yard fine Beta glass fiber layer. The second layer (intended to serve as a low flow resistant, durable backing layer facing the exit side of the gas stream) comprised a six ounce per square yard coarse fiberglass continuous filament reinforcement mat layer.

The end product filter material of this example again demonstrated excellent filtering efficiency with low air flow resistance.

Modifications may be made in the invention without departing from the spirit of it.

The embodiments of the invention in which an exclusive property or privilege is claimed are defined as follows:

1. A dimensionally stable filter structure for removing foreign and particulate material from high temperature fluids comprising at least one batt of relatively brittle, high temperature and corrosion-resistant fibers, said at least one batt being made up of fibers chosen from the class consisting of glass fibers, silica fibers, ceramic fibers, carbon fibers and graphite fibers, said at least one batt being stitched-knitted with high temperature, corrosion-resistant yarns such that said filter structure comprises said at least one batt encapsulated between two outer stitch-knitted layers of said high temperature, corrosion-resistant yarns integrally connected through said at least one batt at a plurality of stitch-through points therein.

2. The structure claimed in claim 1 wherein said high temperature, corrosion resistant yarns comprise metallic monofilament yarns.

3. The structure claimed in claim 1 wherein said high temperature, corrosion resistant yarns are chosen from the class consisting of multifilament metallic and glass yarns.

4. The structure claimed in claim 3 including means to support said batt during stitch-knitting thereof, said support means comprising a part of said filter structure.

5. The structure claimed in claim 4 wherein said support means comprises an open mesh woven scrim of high temperature corrosion resistant fibers.

6. The structure claimed in claim 4 wherein said support means comprises a non-woven substrate.

7. The structure claimed in claim 1 wherein said at least one batt comprises at least two batts stitch-knitted with said high temperature corrosion resistant yarns.

8. The structure claimed in claim 7, wherein, one of said at least two batts comprises fibers of a diameter up to about 10 microns, the other of said at least two batts acts as a supporting substrate and comprises fibers of a diameter up to about 50 microns.

9. The structure claimed in claim 1 including means to support said batt during stitch-knitting thereof, said support means comprising a part of said filter structure.

10. The structure claimed in claim 9 wherein said support means comprises a non-woven substrate.

11. The structure claimed in claim 9 wherein said support means comprises an open mesh woven scrim of high temperature corrosion resistant fibers.

12. The structure claimed in claim 1 wherein said filter structure has small holes at said stitch-through points therein and means to close said holes.

13. The structure claimed in claim 12, wherein said means to close said stitch-through holes comprises sintered particles filling said holes.

14. The structure claimed in claim 1 wherein said filter structure has a warp direction comprising the direction said batt moves during stitch-knitting, said filter structure including straight, laid-in high temperature corrosion resistant yarns extending therein in said warp direction of said filter structure.

15. The structure claimed in claim 1 wherein said filter structure is pleated.

16. A process of making a dimensionally stable filter structure for removing foreign and particulate material from high temperature fluids comprising the steps of providing at least one batt of relatively brittle high temperature and corrosion resistant fibers chosen from the class consisting of glass fibers, silica fibers, ceramic fibers, carbon fibers and graphite fibers, and stitch-knitting said at least one batt with high temperature corrosion resistant yarns such that said filter structure comprises said at least one batt encapsulated between two outer stitch-knotted layers of said high temperature, corrosion-resistant yarns integrally connected through said at least one batt at a plurality of stitch-through points therein.

17. The process claimed in claim 16 wherein said high temperature, corrosion resistant yarns comprise metallic monofilament yarns.

18. The process claimed in claim 16 wherein said high temperature, corrosion resistant yarns are chosen from the class consisting of multifilament metallic and glass yarns.

19. The process claimed in claim 16 including the steps of providing at least two superposed batts of said fibers and stitch-knitting said at least two batts with said high temperature corrosion resistant yarns.

20. The process claimed in claim 16 including the step of reinforcing said at least one batt.

21. The process claimed in claim 20 including the step of needling said at least one batt for purposes of reinforcement of said at least one batt.

22. The process claimed in claim 20 including the step of needling said at least one batt to a non-woven substrate for purposes of reinforcement of said at least one batt.

23. The process claimed in claim 20 including the step of resin bonding said fibers of said at least one batt to reinforce said at least one batt.

24. The process claimed in claim 20 including the step of supporting said at least one batt on an open mesh, high temperature, corrosion resistant scrim during said stitch-knitting step, said scrim being incorporated in said filter structure to increase the dimensional stability of said filter structure.

25. The process claimed in claim 16 including the step of calendering said filter structure to close small holes therein at the points of stitch-through.

26. The process claimed in claim 16 including the steps of filling the small holes in said filter structure at the points of stitch-through therein with small diameter sinterable particles and sintering said particles in place.

27. The process claimed in claim 16 including the step of pretreating said batt fingers with a lubricant to reduce abrasion thereof.

28. The process claimed in claim 16 wherein the direction of movement of said at least one batt during said stitch-knitting comprises the warp direction, and including the step of laying-in high temperature corrosion resistant, stable yarns extending in the warp direction.

29. The process claim in claim 16 including the step of pretreating said yarns with a lubricant to increase their lubricity, flexibility and abrasion resistance.

30. The process claimed in claim 16 including the step of pleating said stitch-knitted filter structure.

* * * * *